United States Patent [19]

Watanabe

[11] Patent Number: 4,635,080

[45] Date of Patent: Jan. 6, 1987

[54] LIQUID INJECTION RECORDING APPARATUS

[75] Inventor: Kenjiro Watanabe, Hiratsuka, Japan

[73] Assignee: Canon Kabushiki Kaisha, Tokyo, Japan

[21] Appl. No.: 715,413

[22] Filed: Mar. 25, 1985

[30] Foreign Application Priority Data

Mar. 30, 1984 [JP] Japan .................................. 59-60580
Mar. 30, 1984 [JP] Japan .................................. 59-60581

[51] Int. Cl.4 .............................................. G01D 15/18

[52] U.S. Cl. ............................ 346/140 R; 346/139 C; 400/126; 400/175

[58] Field of Search ........................... 346/140, 139 C; 400/175, 126

[56] References Cited

U.S. PATENT DOCUMENTS 3,787,880 1/1974 Kattner ................................. 346/75
3,958,254 5/1976 Okabe ............................. 346/139 C
4,074,284 2/1978 Dexter ................................. 346/140
4,329,698 5/1982 Smith .................................. 346/140
4,350,448 9/1982 Hanagata ......................... 400/175 X
4,380,771 4/1983 Takatori .............................. 346/140
4,539,569 9/1985 Watanabe ............................ 346/140

*Primary Examiner*—Joseph W. Hartary
*Attorney, Agent, or Firm*—Fitzpatrick, Cella, Harper & Scinto

[57] ABSTRACT

A liquid injection recording apparatus includes a head having orifices provided to discharge liquid and form flying droplets, and energy generating members for generating energy utilized to form the droplets. Electrical contacts for inputting an electrical signal to the energy generating members are provided on a surface different from a surface in which the orifices are provided. The liquid injection recording apparatus has such liquid injection recording head mounted on a mounting portion on which is provided electrical contacts adapted to be connected to the electrical contacts of the recording head when the recording head is mounted on the mounting portion.

4 Claims, 11 Drawing Figures

LIQUID INJECTION RECORDING APPARATUS

BACKGROUND OF THE INVENTION

1. Field of the Invention

This invention relates to a liquid injection recording head and a liquid injection recording apparatus.

In a liquid injection recording apparatus, it will be desirable that a liquid injection recording head (hereinafter referred to as the recording head) can be easily mounted and dismounted with respect to a carriage for the purpose of maintenance or interchange of the recording head. Therefore, in order to supply a driving power and a signal to the recording head, it may heretofore be considered to provide electrical contacts on the recording head and the carriage, respectively, and bring the electrical contacts of the two into contact with each other when the recording head will be mounted on the carriage, thereby accomplishing the supply of the driving power and the signal to the recording head. Most recording heads are of the type which may be mounted on the carriage and therefore, the electrical contacts of the recording head will be taken out from the recording head by flexible wiring or the like or may be provided on the lower portion of the orifice surface of the recording head in which orifices may be provided.

In a recording head wherein the orifice surface in which orifices for injecting ink may be provided and an electrical wiring substrate having said electrical contacts may be formed on the same plane, the electrical contacts may be provided below the orifice surface for the reason set forth above, and this will result in an inconvenience that the electrical contacts are stained or corroded by the ink dropping from the orifices and cause unsatisfactory contact and thus, orifices do not discharge the liquid (ink) or the discharging condition becomes unstable.

SUMMARY OF THE INVENTION

In view of the above-described prior art, it is an object of the present invention to provide a recording head which can be easily mounted and dismounted with respect to a recording apparatus body or a carriage in the body and which causes no inconvenience by the mounting or dismounting thereof.

It is another object of the present invention to eliminate the above-noted disadvantages peculiar to the prior art and to provide a liquid injection recording apparatus which can always realize a stable liquid discharging condition.

It is still another object of the present invention to provide a liquid injection recording head having orifices provided to discharge liquid and form flying droplets and energy generating members for generating energy utilized to form said droplets and wherein electrical contacts for inputting an electrical signal to said energy generating members are provided on a surface different from a surface in which said orifices are provided.

It is yet still another object of the present invention to provide a liquid injection recording apparatus having mounted thereon a liquid injection recording head having orifices provided to discharge liquid and form flying droplets and energy generating members for generating energy utilized to form said droplets and wherein electrical contacts for inputting an electrical signal to said energy generating members are provided on a surface of said liquid injection recording head different from a surface in which said orifices are provided and on the mounting portion of said apparatus, there are provided electrical contacts adapted to be connected to said electrical contacts when said liquid injection recording head is mounted on said mounting portion.

DESCRIPTION OF THE PREFERRED EMBODIMENTS

Some embodiments of the liquid injection recording head of the present invention will hereinafter be described specifically and in detail with reference to the drawings.

Figure 1:
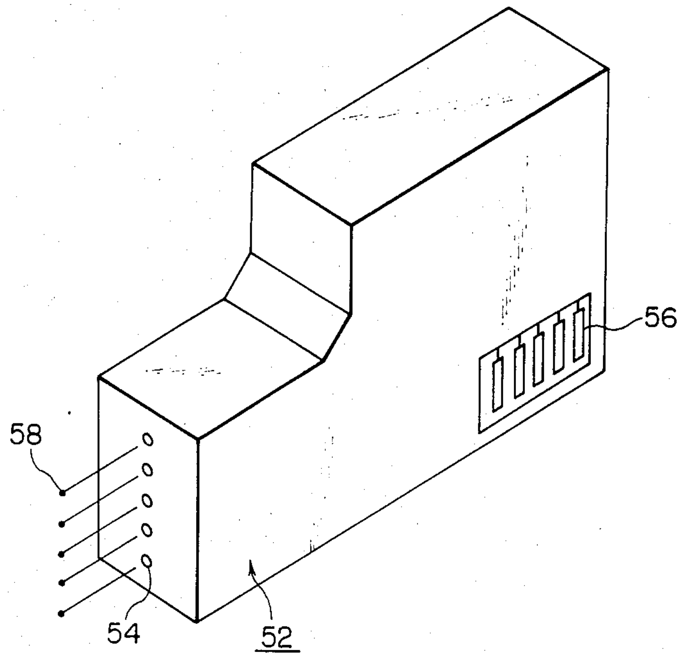
FIGS. 1 and 2 are schematic perspective views of the recording heads of the present invention.

FIG. 1 is a perspective view of a recording head 52 according to a first embodiment of the present invention, and the recording head 52 in its shown state is mounted on a carriage, not shown. Orifices 54 are provided in that surface of the recording head 52 which is opposed to printing paper, and electrical contacts 56 are provided on a surface of the recording head which is different from the surface in which the orifices 54 are provided. Reference numeral 58 designates discharged droplets such as ink. The recording head 52 is mounted on the carriage (not shown) in such a manner that the electrical contacts 56 are in contact with the electrical contacts (not shown) of the carriage. A driving power signal is applied from the carriage side to the recording head 52 and the droplets (ink) 58 are injected from the orifices 54, whereby the recording by the recording head 52 is accomplished. At this time, in the present embodiment, the electrical contacts 56 can be prevented from being stained by the ink dropping from the orifices 54 because the orifices 54 and the electrical contacts 56 are provided in the different surfaces.

Figure 2:
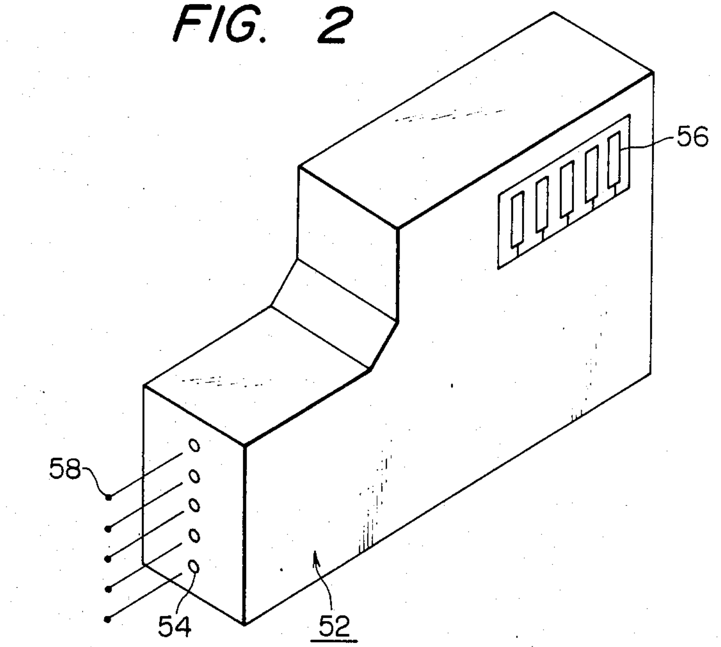

FIG. 2 shows another embodiment of the present invention. A feature of this embodiment is that the electrical contacts 56 are provided above the orifices 54. Thus, the electrical contacts 56 can be better prevented from being stained by the ink than in the above-described embodiment.

In the above-described embodiments, the electrical contacts have been shown as being provided on the underside or a side surface of the recording head, but alternatively, the electrical contacts may be provided on any other surface of the recording head such as the upper surface or the back surface which is opposite to the orifices 54.

An embodiment of the liquid injection recording apparatus of the present invention will now be described specifically and in detail.

Figure 3:
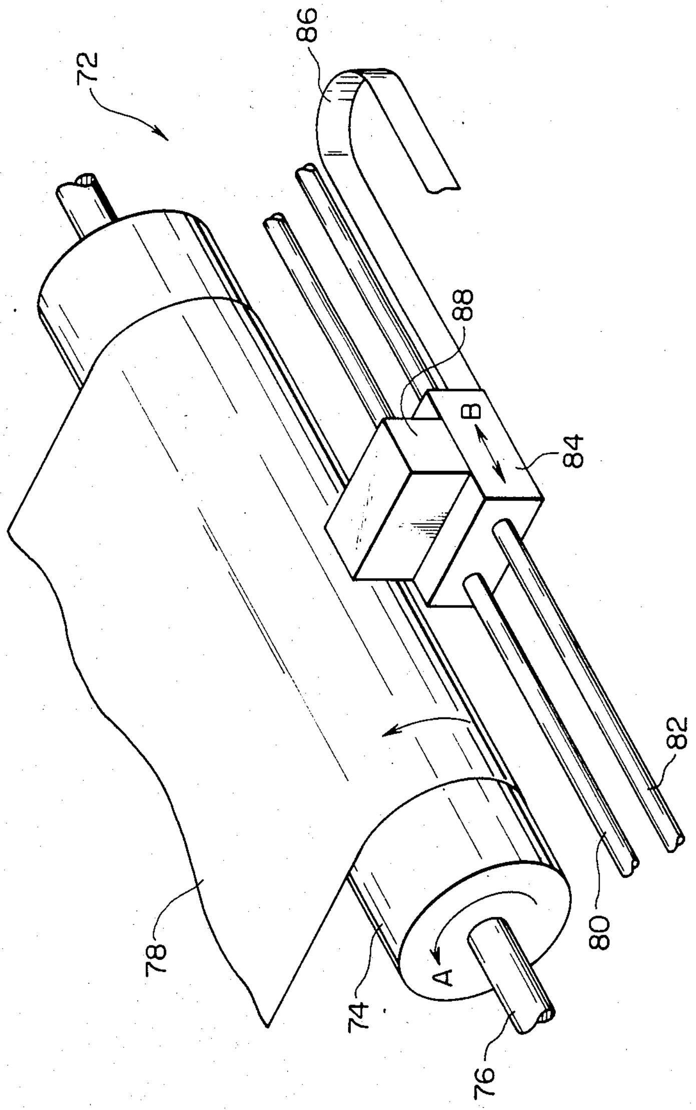
FIG. 3 is a schematic perspective view of a liquid injection recording apparatus according to an embodiment of the present invention.

FIG. 3 is a perspective view of the liquid injection recording apparatus 72 according to the present embodiment. In FIG. 3, reference numeral 74 designates a platen rotatable in the direction of arrow A about a platen shaft 76, and reference numeral 78 denotes a recording medium (hereinafter referred to as paper) such as printing paper. The paper 78 is rotated in the same direction as the platen 74 when the platen 74 is rotated. Reference numerals 80 and 82 designate guide shafts. A carriage 84 is provided for sliding movement in the directions of bilateral arrow B relative to the guide shafts 80 and 82. Reference numeral 86 denotes a flexible cable for transmitting a driving power and a signal to the carriage 84. Reference numeral 88 designates a liquid injection recording head (hereinafter referred to as the recording head) mounted on the carriage 84.

Figure 4:
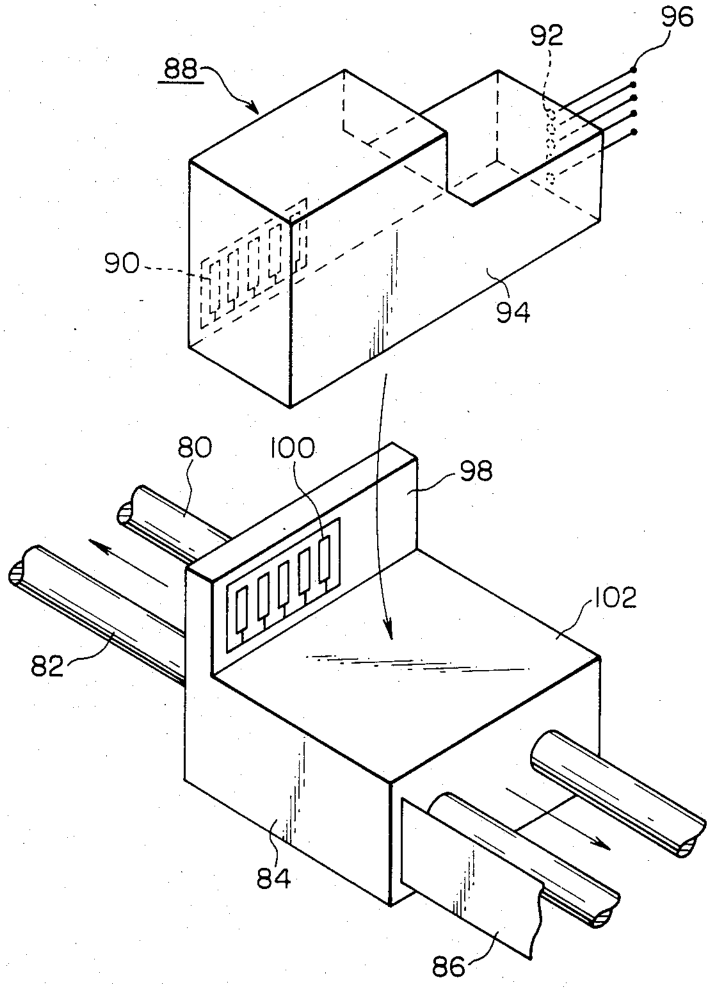
FIGS. 4 to 7 are schematic perspective views of the carriages and recording heads of the present invention.

FIG. 4 is a detailed view of the carriage 84 and recording head 88 according to the present embodiment. Recording head side electrical contacts 90 (hereinafter referred to as the first contacts) for transmitting an electric power and a signal are formed on a surface of the recording head 88 which is different from a surface in which orifices 92 are provided. Reference numeral 94 designates a liquid reservoir for containing therein liquid such as ink, and reference numeral 96 denotes discharged droplets such as ink.

The carriage 84 is provided with a protruded portion 98, which in turn is provided with carriage side electrical contacts 100 (hereinafter referred to as the second contacts) adapted to contact the first contacts 90 of the recording head 88. To mount recording head 88 on the carriage 84, the recording head 88 is placed onto the upper surface 102 of the carriage 84 in such a manner that the first contacts 90 of the recording head 88 contact the second contacts 100 of the carriage 84. When effecting the printing, a driving power and a control signal supplied through a flexible cable 86 provided on the carriage 84 are supplied to the first contacts 90, the former being directly supplied and the latter being converted into a driving signal voltage by a control circuit (not shown) in the carriage, whereafter they are transmitted to the second contacts 100 which are in contact with the first contacts 90, whereby liquid (ink) is injected from the orifices 92.

Figure 5:
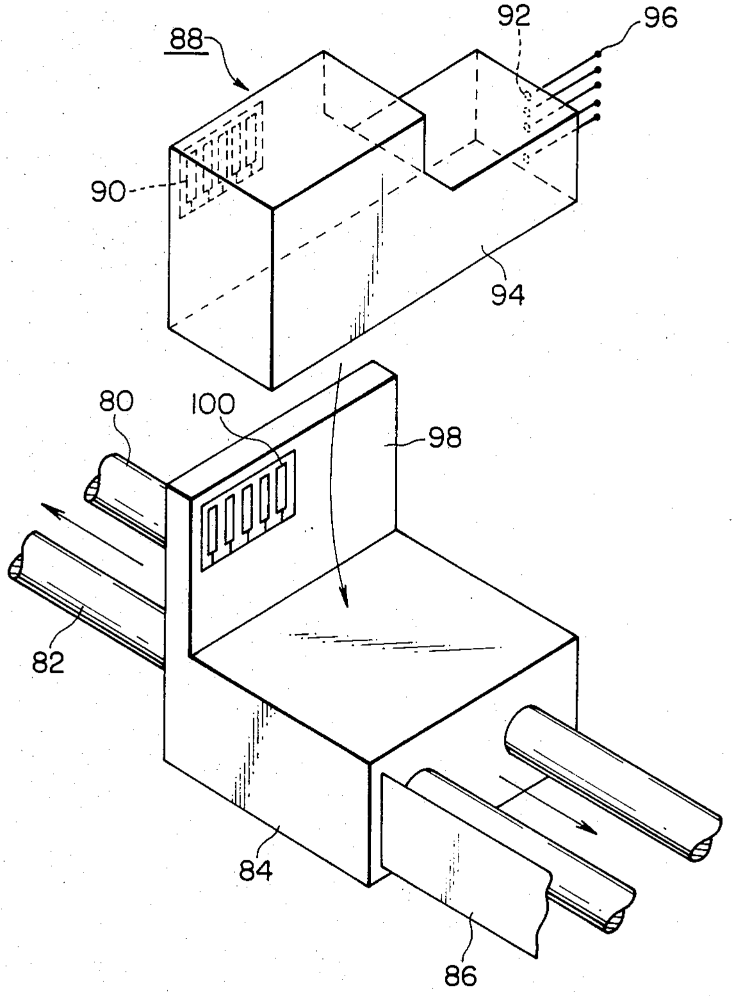

FIG. 5 shows still another embodiment of the present invention. A feature of this embodiment is that for the recording head 88 in which the first contacts 90 are formed above the orifices 92 to be mounted on the carriage 84, the second contacts 100 formed on the protruded portion 98 are disposed at a higher position than in the previous embodiment and correspondingly the height of the protruded portion 98 is greater than in the previous embodiment. According to this embodiment, the first contacts 90 and the second contacts 100 are located above the orifices 92 and therefore, the contacts can be even better prevented from being stained by the ink flowing out of the orifices.

Figure 6:
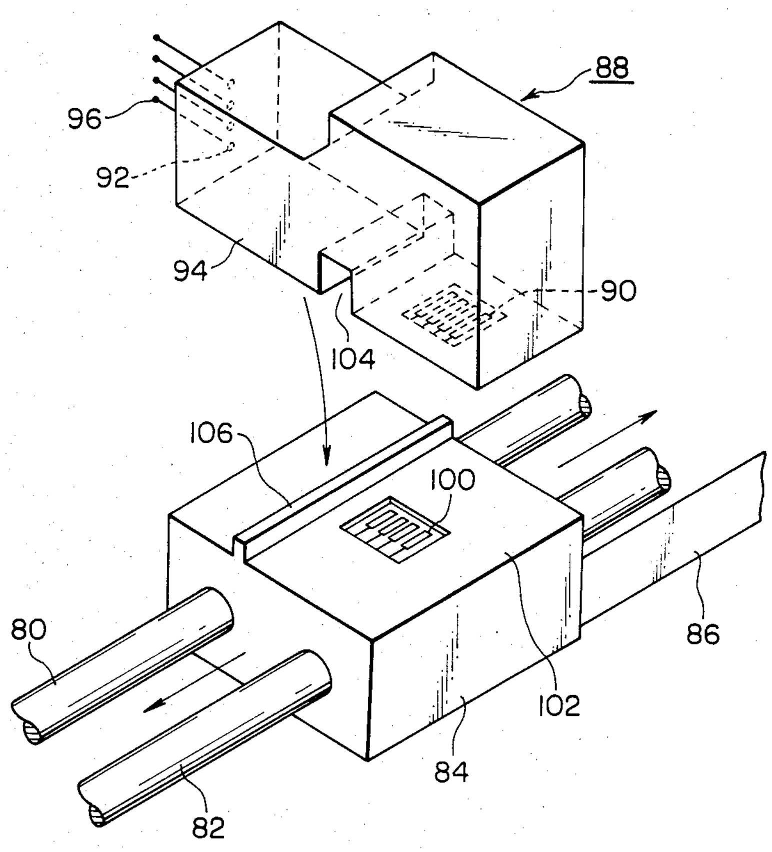

FIG. 6 shows yet still another embodiment of the present invention. In this embodiment, a groove 104 which partitions the orifices 92 and the first contacts 90 is provided in the bottom surface of the recording head 88 provided with the orifices 92 in a side surface thereof and provided with the first contacts 90 on the bottom surface thereof. Second contacts 100 adapted to contact the first contacts 90 and a barrier 106 engageable with the groove 104 of the recording head 88 are provided on the upper surface of the carriage 84 for mounting the recording head 88 thereon, and partition means is formed by the groove 104 and the barrier 106. By the barrier 106 being so provided between the orifices 92 and the first contacts 90 and between the orifices 92 and the second contacts 100, the first and second contacts 90 and 100 can be better prevented from being stained by the ink dropping from the orifices 92.

Figure 7:
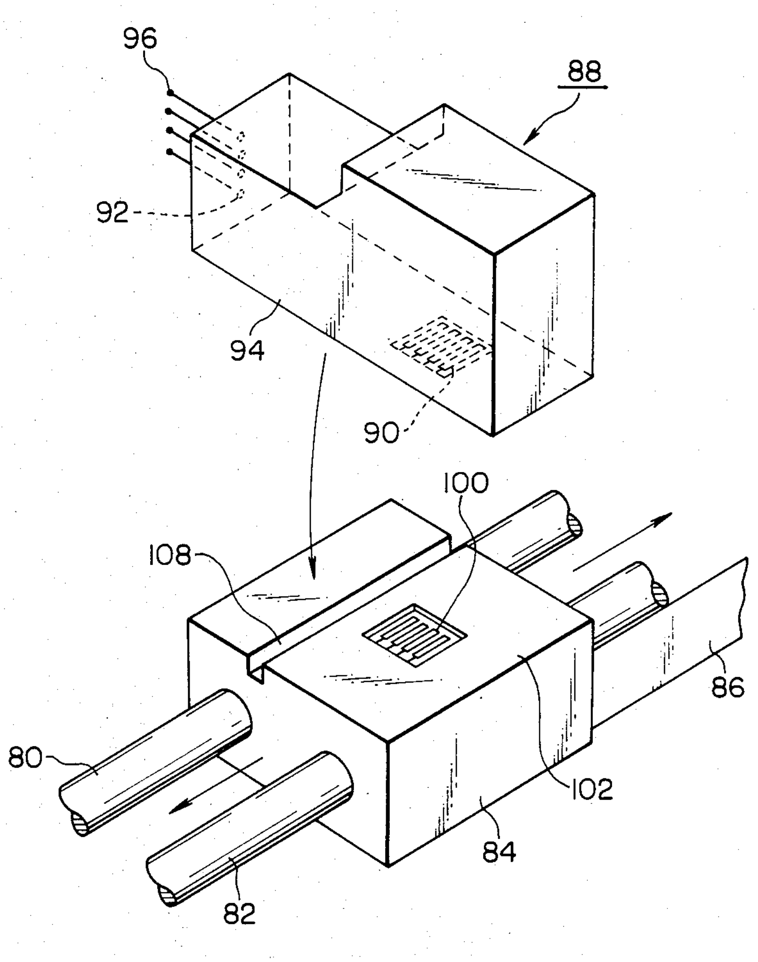

FIG. 7 shows a further embodiment of the present invention. In this embodiment, there is shown a carriage 84 for mounting thereon the recording head 88 provided with orifices 92 in a side surface thereof and provided with first contacts 90 on the bottom surface thereof. Second contacts 100 are provided on the upper surface 102 of the carriage 84, and a groove 108 which is partition means is formed in the upper surface of the carriage 84 so as to partition the orifices 92 and the first and second contacts 90, 100 when the recording head 88 is mounted on the carriage 84. According to this embodiment, the ink having flowed out of the orifices 92 does not come to the first and second contacts 90 and 100 and thus, these contacts 90 and 100 are very rarely stained by the ink dropping from the orifices 92.

According to the present invention, as described above specifically and in detail, by a simple structure in which the orifices and the electrical contacts are disposed in different surfaces and further the electrical contacts are disposed above the orifices, the electrical contacts can be prevented from being stained or corroded by the ink dropping from the orifices and causing unsatisfactory contact and thus, a stable droplet discharging condition can always be kept.

Also, according to the present invention, as described above specifically and in detail, the recording head in which the orifices and the electrical contacts are disposed in different surfaces is mounted on the carriage, whereby the electrical contacts can be prevented from being stained or corroded by the ink dropping from the orifices and causing unsatisfactory contact and thus, a stable droplet discharging condition can always be kept.

An embodiment of the method of fixing the recording head shown in FIG. 6 to the carriage and of the method of connecting the contacts will now be described in detail by reference to the drawings.

Figure 8:
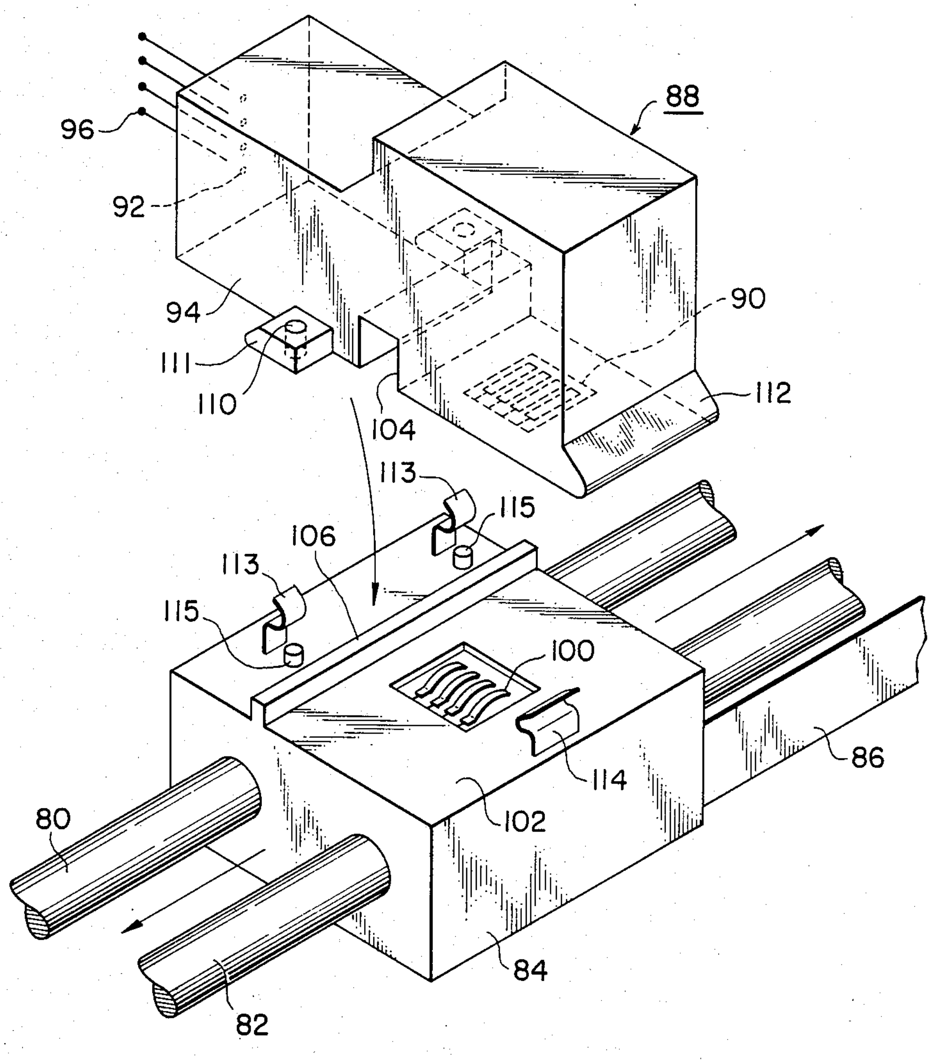
FIG. 8 is a perspective view for explaining a method of fixing the recording head to the carriage and a method of connecting the contacts of the recording head and the carriage.

As shown in FIG. 8, the recording head 88 has on side surfaces thereof a mounting portion 111 having a hole 110 which is a positioning fitting portion, and an engaging portion 112. The carriage 84 has on the upper surface 102 thereof a head keeping plate spring 113 engageable with the mounting portion 111, a head keeping plate spring 114 engageable with the engaging portion 112, and a positioning pin 115 for fitting in the hole 110.

The second contacts 100 are formed by plate spring-like members curved so as to protrude toward the recording head 88 so as to correspond to the first contacts 90 formed on the bottom of the recording head 88. As the first contacts 90, use may sufficiently be made, for example, of an electrical wiring portion formed on a printed wiring substrate or contacts of the heretofore known contact shape. It is preferable from the viewpoint of preventing unsatisfactory contact that the second contacts 100 be formed of a material such as phosphor bronze having resiliency, but any of generally known materials may be used for the second contacts if they have electrical conductivity.

To mount the recording head 88 on the carriage 84 thus constructed, the recording head 88 may be simply urged against the carriage 84 from above against the forces of the head keeping plate springs 113 and 114. If the positions of the hole 110 and the pin 115 are accurately coincident with each other at that time, the mounting portion 111 and the engaging portion 112 are engaged with the plate springs 113 and 114, respectively, and at the same time, electrical connection is completed.

While the mounting portion 111 and the engaging portion 112 have been shown as being directly integral with the recording head 88, they may be separate from and adapted to be attached to the recording head 88. However, making the mounting portion and the engaging portion integral with the recording head is preferable because, in that case, detachment or positional deviation of those portions does not occur.

Figure 9:
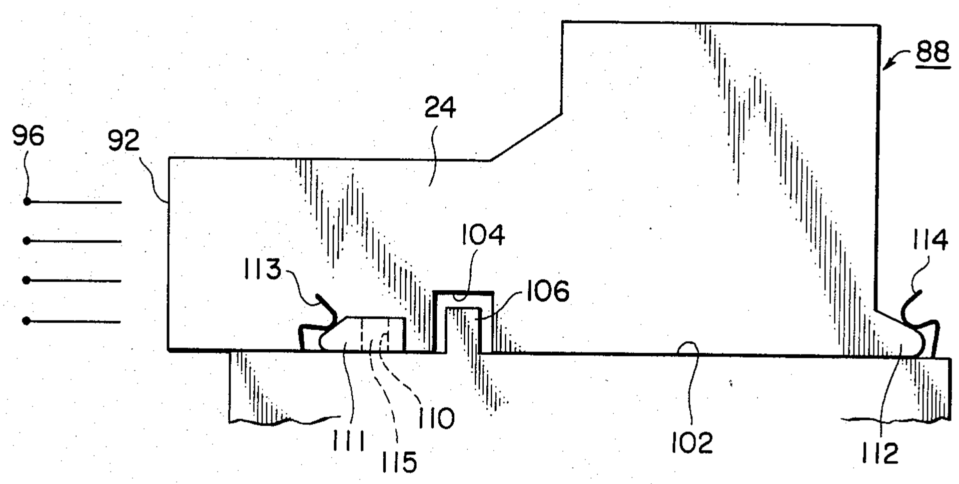
FIGS. 9 and 10 are schematic cross-sectional views of the recording head.
Figure 10:
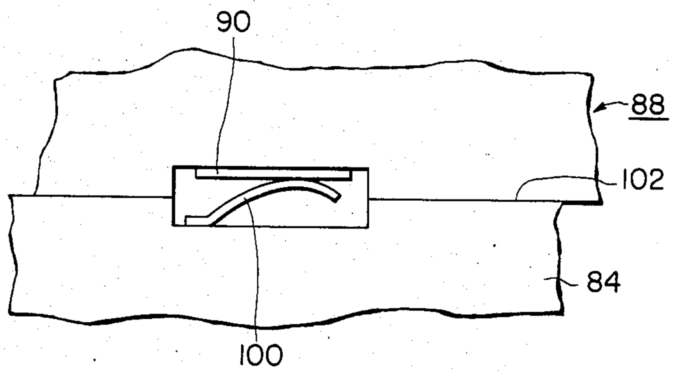

The schematic cross-sectional views of FIGS. 9 and 10 show the engaged condition and the electrically connected condition in a state in which the recording head 88 is mounted.

The relation between the hole and pin which are positioning means may be reverse.

Figure 11:
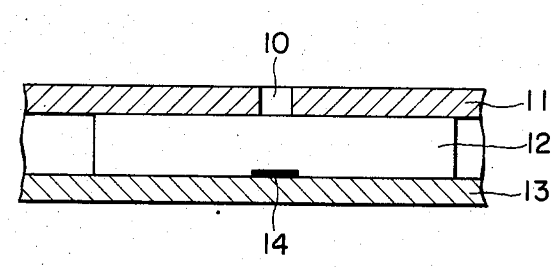
FIG. 11 shows the structure of the liquid injection recording head used in the present invention.

FIG. 11 shows the structure of the liquid injection recording head used in the present invention. In FIG. 11, reference numeral 10 designates an orifice, reference numeral 11 denotes an orifice plate, reference numeral 12 designates a flow path wall, reference numeral 13 denotes a base plate, and reference numeral 14 designates an energy generating member.

According to the present embodiment, the positioning; mounting and dismounting of the recording head can be easily accomplished by means of the positioning pin and plate spring and therefore, when the ink in the recording head has become exhausted or non-discharge of droplets has occurred, the recording head can be simply interchanged to continue the recording.

By making the recording head interchangeable from above, the interchanging operation becomes easy and the recording head hardly interferes with other mechanism such as the platen during the interchange of the recording head and compactness and light weight of the apparatus body can be achieved.

Also, by making the recording head mountable and dismountable by one touch, the ordinary user can easily interchange the recording head, and this leads to a further effect that the down-time of the apparatus is shortened.

I claim:

1. A liquid injection recording apparatus comprising:

(A) a liquid injection recording head including:

(a) means defining orifices for discharging liquid there through to form flying droplets;

(b) energy generating members for generating energy utilized to form said droplets;

(c) means defining a bottom surface; and (d) electrical contacts provided on said bottom surface of said recording head for inputting an electrical signal to said energy generating members therethrough;

(B) a mounting member for mounting said liquid injection recording head thereon and having an upper surface, said mounting member having electrical contacts on the upper surface thereof, said electrical contacts of said mounting member being adapted to be connected to said electrical contacts of said recording head when said recording head is mounted on said mounting member, and (C) partition means for partitioning said electrical contacts of said recording head and said electrical contacts of said mounting member from said orifices of said recording head, said partition means being provided in at least one of said bottom surface of said recording head and said upper surface of said mounting member, whereby the flow of liquid from said orifices to the electric contacts is prevented by said partition means.

2. A liquid injection recording apparatus according to claim 1, characterized in that said partition means is a concave portion.

3. A liquid injection recording apparatus according to claim 1, characterized in that said partition means is a convex portion.

4. A liquid injection recording apparatus according to claim 1, characterized in that said recording head has a mounting engaging portion.

* * * * *